Sept. 14, 1948.  A. A. ANDERSON  2,449,047
AUTOMATIC ADHESIVE TAPE DISPENSER
Filed June 27, 1941  5 Sheets-Sheet 1

Inventor
Arthur A. Anderson
By Paul Carpenter
Attorney

Sept. 14, 1948.　　　A. A. ANDERSON　　　2,449,047
AUTOMATIC ADHESIVE TAPE DISPENSER
Filed June 27, 1941　　　　　　　　　　5 Sheets-Sheet 2
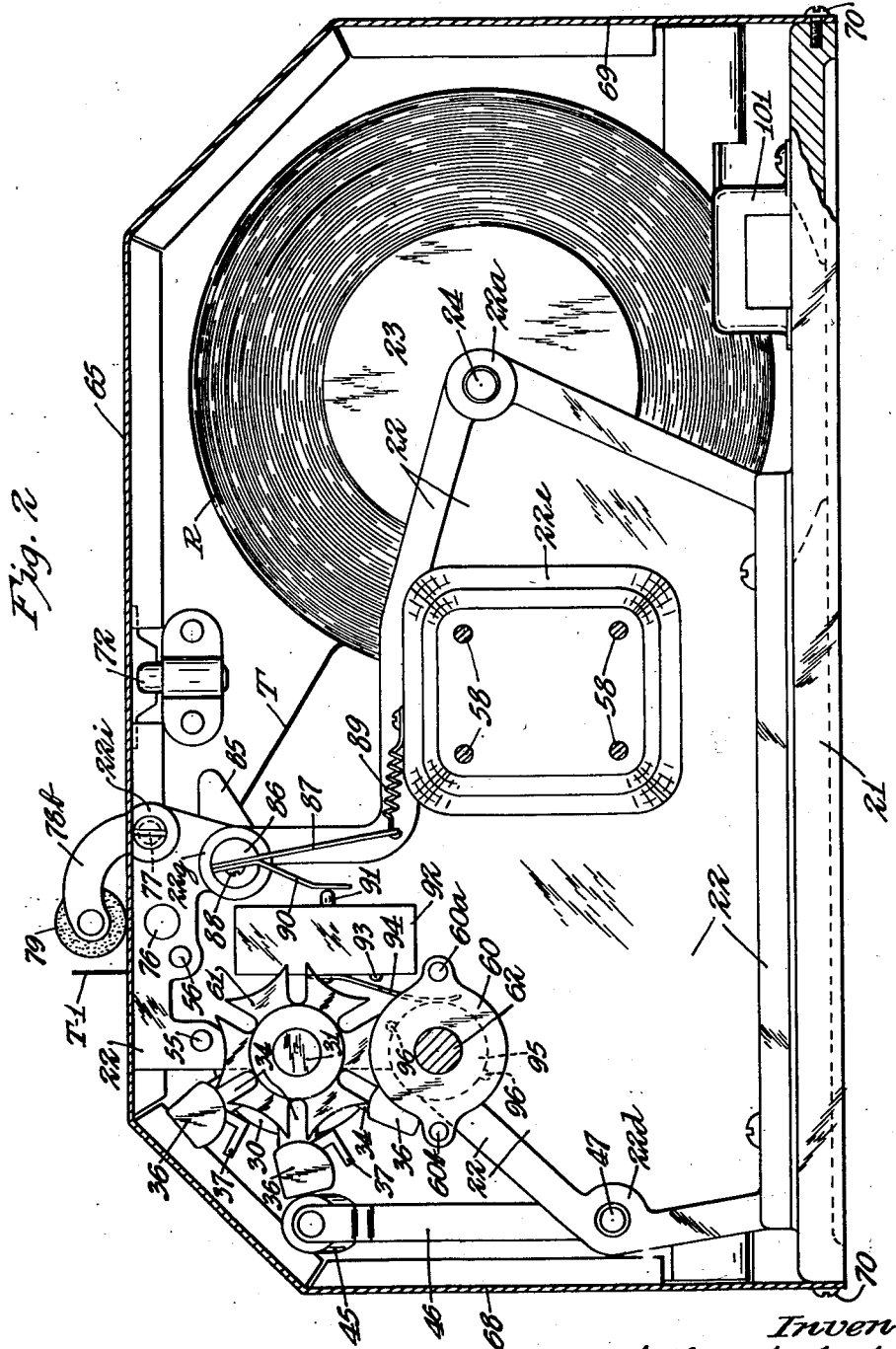
Inventor
Arthur A. Anderson
By Paul Carpenter
Attorney

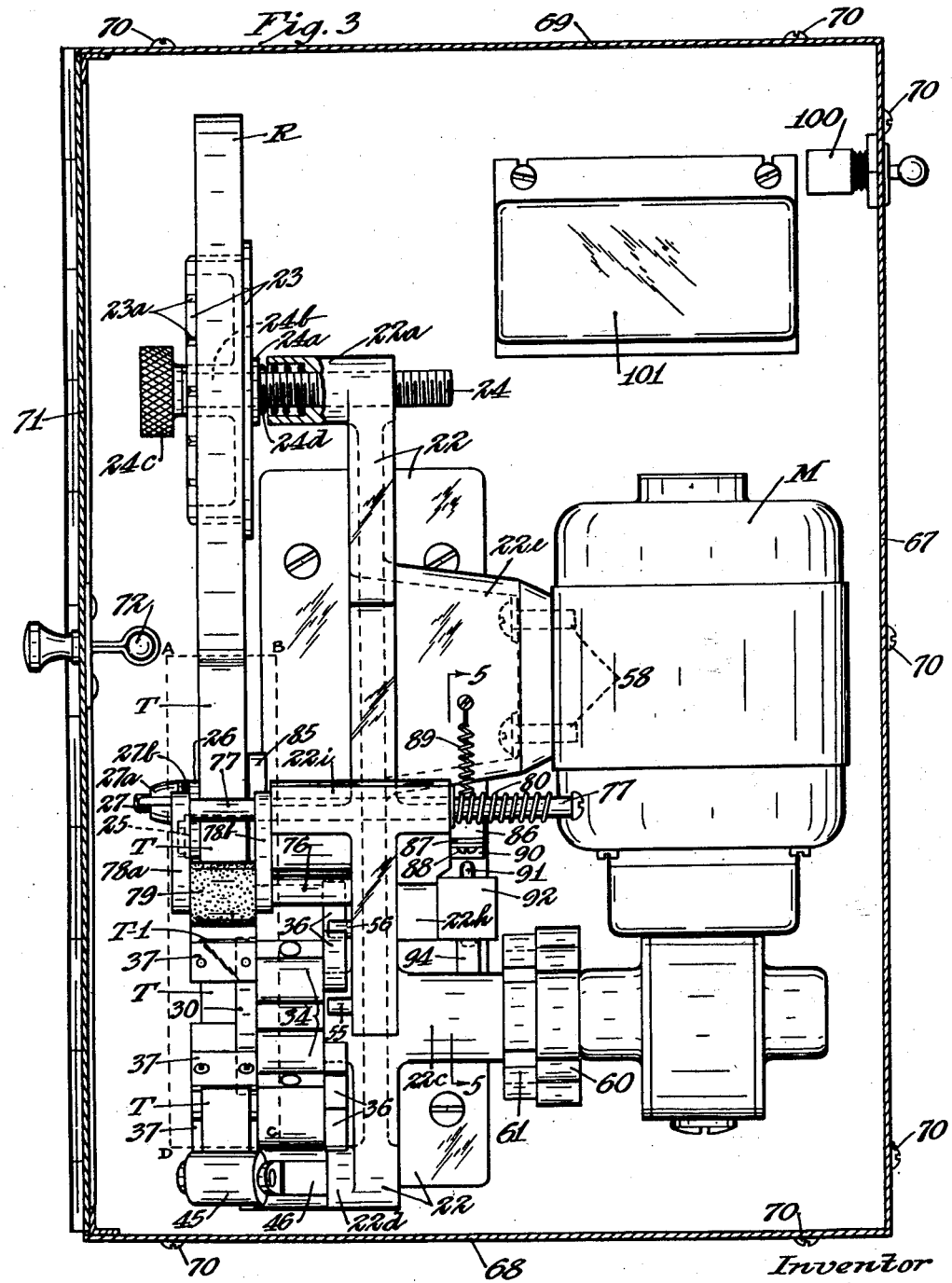

Sept. 14, 1948.     A. A. ANDERSON     2,449,047
AUTOMATIC ADHESIVE TAPE DISPENSER
Filed June 27, 1941     5 Sheets-Sheet 4
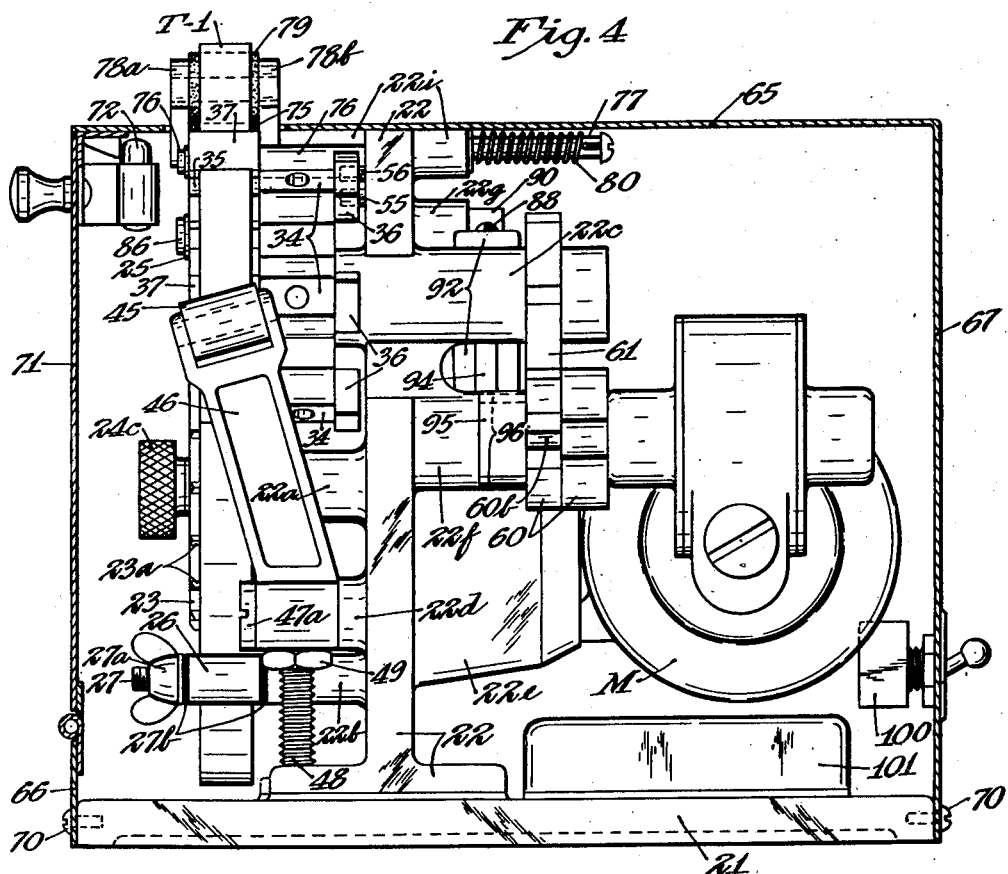
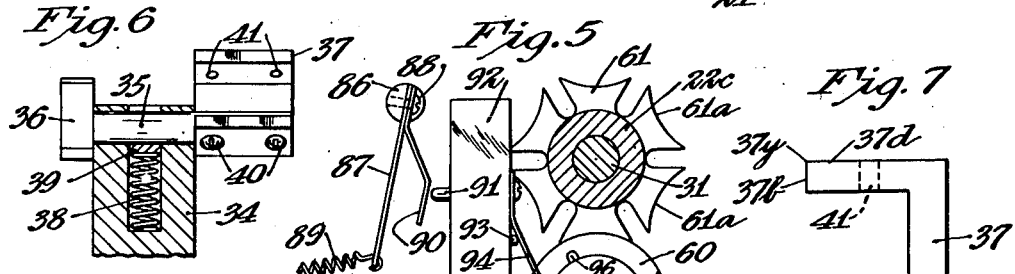
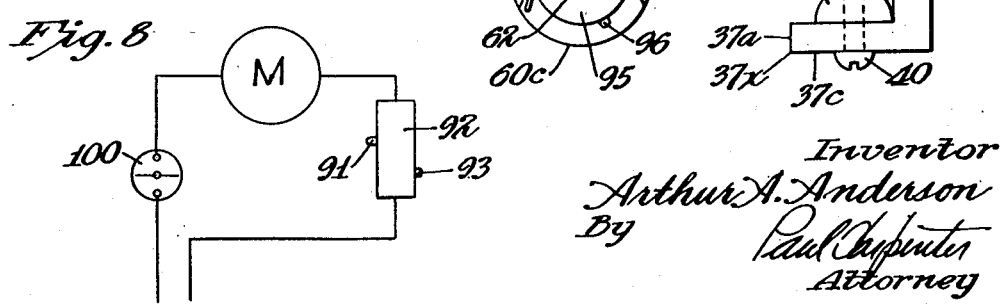
Inventor
Arthur A. Anderson
By Paul Carpenter
Attorney

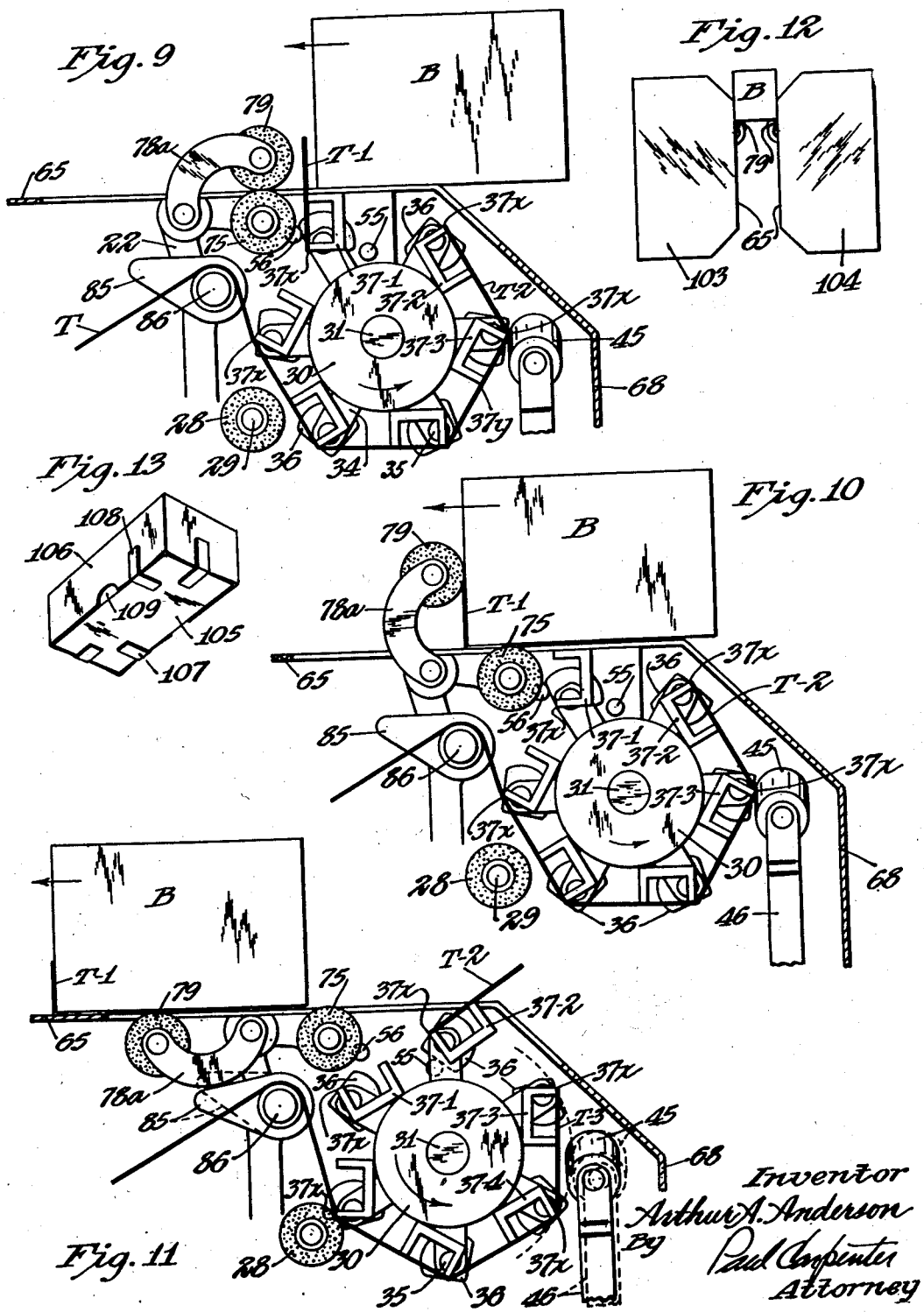

Patented Sept. 14, 1948

2,449,047

UNITED STATES PATENT OFFICE 2,449,047

AUTOMATIC ADHESIVE TAPE DISPENSER

Arthur A. Anderson, Rose Township, Ramsey County, Minn., assignor to Minnesota Mining & Manufacturing Company, St. Paul, Minn., a corporation of Delaware Application June 27, 1941, Serial No. 400,143

18 Claims. (Cl. 164—68)

This invention relates to dispensers for tape, especially tape that is coated with adhesive. It is especially adapted to provide a device for dispensing normally tacky or pressure-sensitive adhesive tape in roll form, such adhesive tape having a paper or cloth backing or a backing of a cellulosic film coated on one side with a tacky adhesive which is adherent without the necessity of being activated by water or other solvents or heat, and which can be unwound from rolls thereof without transfer or offsetting of the adhesive due to the highly cohesive nature of the adhesive.

One problem in using such tape is the difficulty in dispensing accurately measured lengths with sufficient speed to permit its use for sealing or labeling packages and other objects in fast moving mass production assembly lines.

Another problem is the difficulty in positioning severed lengths accurately and quickly on a surface to which they are to be applied.

The present invention has among its objectives the following:

To provide a simple device whereby a predetermined length of pressure-sensitive adhesive tape is accurately measured, severed, dispensed and held in position ready to be applied to a surface;

To provide such a device in which the entire action of measuring, severing, dispensing and positioning is automatic;

To provide an automatic device for rapidly sealing and/or labeling packages in factory assembly lines with pressure-sensitive adhesive tape direct from standard commercial supply rolls of such tape;

To provide such a device which will operate at high speed but whose dispensing speed is automatically adjusted to the speed at which the dispensed lengths of tape are removed, i. e. which will never dispense faster than the rate at which the tape is being consumed or used.

To provide a simple device whereby a plurality of objects such as boxes, bags, packages, letters, folders, or the like, may be automatically sealed with accurately measured predetermined lengths of pressure-sensitive adhesive tape in rapid succession simply by propelling the objects to be sealed adjacent to the said device;

To provide a simple device whereby units of printed pressure-sensitive adhesive tape may be rapidly applied to, and accurately positioned upon, a plurality of objects as they are fed to the device;

To provide such a device wherein the cutting or severing means will not become clogged with adhesive;

To provide such a device wherein the severed edge of each length will be a smooth straight cut.

The invention provides a device for dispensing only, or a device that applies as well as dispenses. That is, the invention provides a machine which dispenses tape in lengths ready for removal and use, leaving the application of the tape to be made by other means, either manual or mechanical; and the invention also provides a machine that, in addition to dispensing the lengths of tape, applies them to objects such as packages, boxes, bottles, cards, etc.

Dispenser claims appear in the present patent. Applier claims appear in Patent No. 2,363,277 which issued on November 21, 1944, on application Serial No. 516,717 which was filed on January 1, 1944, as a division of the application on which the present patent issued.

Briefly the invention provides a holder for a supply roll of the tape, a "cutter wheel" and an "anvil member." The cutter wheel is equipped with tape-carrying means and with severing means and is adapted to receive the tape from the roll and to cut it into desired lengths by pressing it against the anvil member.

The tape-carrying means may comprise a plurality of tape-gripping elements positioned on the wheel in spaced relationship and adapted to retain or hold the tape at spaced-apart portions. The severing means may comprise a plurality of severing elements or "severing edges" positioned on the wheel in spaced relationship in such a manner that the tape passes over these severing edges when it is trained around the wheel. The wheel and anvil member are positioned in relation to each other in such a manner that the said edges are successively pressed against the anvil member as the wheel rotates, thereby severing the tape. The severed lengths continue to be held by the tape-gripping elements with at least a portion of the severed length free so that it may be contacted by manual or mechanical means and removed from the gripping element ready for use.

The tape-gripping elements may be pivotally mounted in spaced relationship on the wheel and adapted to turn while carrying a severed piece of tape so as to hold a portion of the tape in position for removal. Also such pivotally mounted members may be "cutters" which provide at once the gripping elements and the severing elements (or severing edges).

In dispensers for the above mentioned pressure-sensitive adhesive type of tape, the tape-gripping elements may be relatively smooth surfaces which will grip the tape by reason of the tape's adherence thereto.

The dispenser may be equipped with applier means for pressing a severed piece of tape against an object which is advanced or otherwise brought into engagement therewith.

The dispenser may also have mechanical means for propelling the tape through the machine and for rotating the cutter wheel. Such propelling and rotating may be continuous; or it may be intermittent, with means for automatic stopping upon or after severance of a piece of tape, and with means for automatic starting upon or after removal of the severed piece of tape at a dispensing point or station. The dispenser may have such mechanical and automatic means regardless of whether or not it is equipped with applier means.

The specific machine that is described and illustrated in the following description and drawings as illustrative of my invention is a portable electrically operated automatic tape dispenser equipped with applier means, particularly suited for use in factory assembly lines and in stores for rapid sealing of the edges of boxes and packages with accurately measured uniform lengths of pressure-sensitive adhesive tape.

In the accompanying drawings and description the end of the machine at which the operator stands when facing the machine to operate it is called the front end, and the terms "right" and "left" are from the point of view of such operator.

Figures 1 and 2 are left and right side elevations, respectively, of the machine with the left and right sides, respectively, of the casing broken away. In Figure 2 the motor is not shown.

Figure 3 is a plan view of the machine with the top of the casing broken away.

Figure 4 is a front elevation of the machine with the front of the casing broken away.

Figure 5 is a vertical section taken on the line 5—5 in Figure 3 showing the Geneva wheels and mechanism for starting and stopping the motor (motor not shown in Figure 5).

Figure 6 is a radial sectional view of a cutter arm in dispensing position taken on the line 6—6 in Figure 1.

Figure 7 is a side elevation of a cutter.

Figure 8 is a circuit diagram.

Figures 9, 10 and 11 are left side elevations of the cutter wheel and applier mechanism with the left side of the casing broken away showing a box before, during and after sealing, respectively.

Figure 12 is a diagrammatic view of two machines positioned to seal two edges of one box simultaneously.

Figure 13 is a perspective view of the under side of a box that has been sealed by a machine embodying the present invention.

Figure 1:
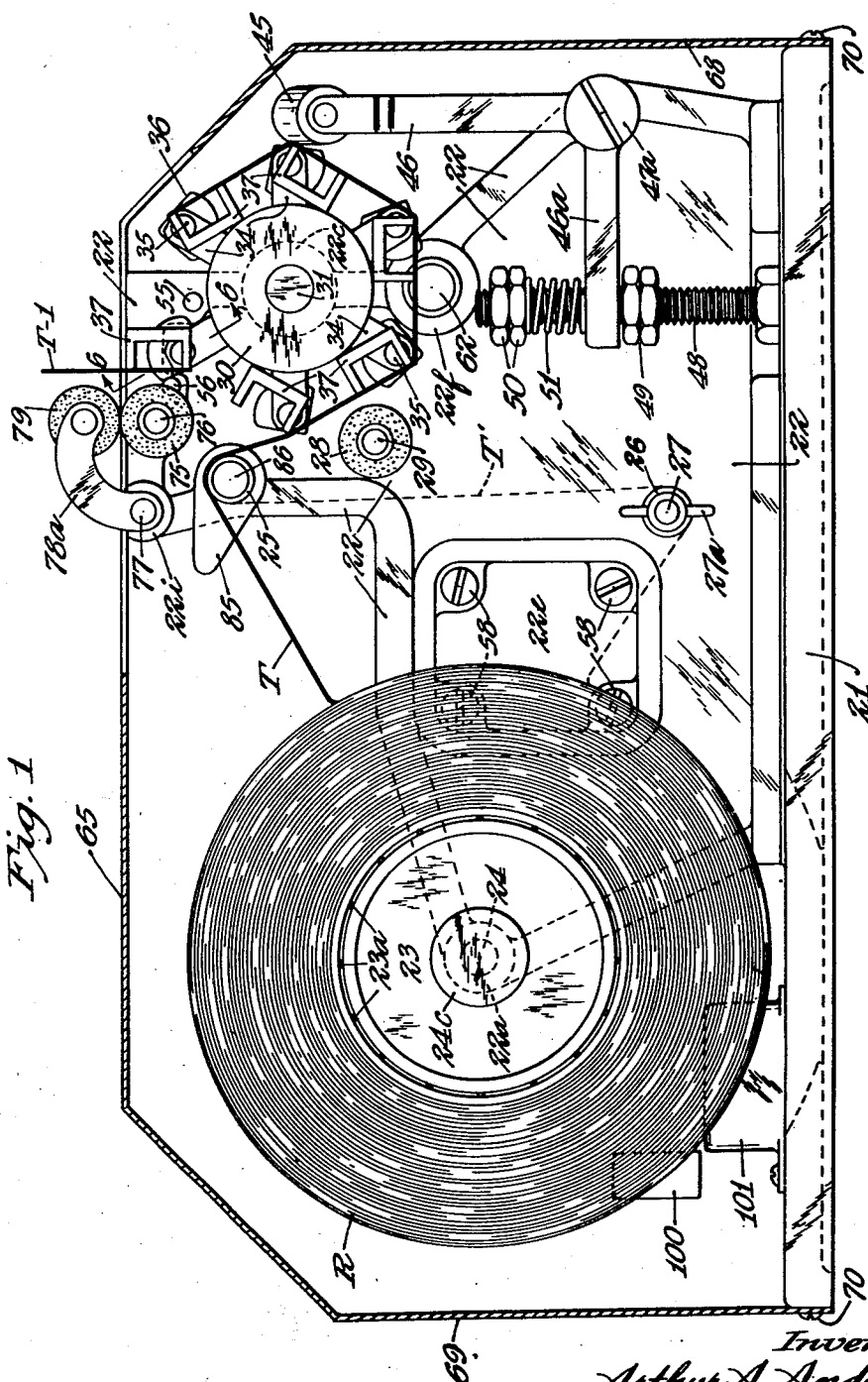

To the base 21 is rigidly attached the upright frame 22 which in the present embodiment is cast in one long relatively narrow piece with bosses at proper points to which are attached the various parts of the machine, all of said parts being supported directly or indirectly by the frame 22. Base 21 may be of heavy weight to prevent movement of the portable machine while in use.

The supply roll R of pressure-sensitive adhesive tape T is carried on the tape roll holder drum 23 towards the rear of the machine while the mechanism for withdrawing the tape from the roll, propelling it through the machine, dispensing it in lengths, and positioning it ready for removal and/or application to boxes, packages, envelopes, etc., is towards the front of the machine.

Tape holder drum 23 may be of a size to receive the standard commercial sizes of rolls of pressure-sensitive adhesive tape such as that sold under the trade-name "Scotch," but if desired, the machine may be provided with several interchangeable drums of varying sizes.

The periphery of tape holder drum 23 is provided at intervals with ridges 23a extending parallel to the drum's axis so as to insure a tight fit between the drum and the roll of tape notwithstanding any possible slight variance in actual size of rolls that are used from time to time. The ridges also help to prevent slipping.

Tape holder drum 23 is rotatably mounted on frame 22 by means of axle-bolt 24 so that its axis is parallel to the base 21 and at right angles to the upright frame 22. It is aligned so that the full width of tape T will contact the cutting elements or edges on the cutter wheel 30 as the tape is drawn forward from roll R through the machine.

Tape drum 23 is journaled onto an unthreaded portion 24b of axle-bolt 24 so as to turn freely thereon between the axle-bolt head 24c and a flange 24a (Figure 3). Boss 22a is provided as a part of frame 22 to provide adequate support for axle-bolt 24, the end of which is in threaded engagement with the boss. In order to make this threaded engagement sufficiently tight so as to make the axle-bolt relatively rigid in the frame, the hole in the boss which receives the axle-bolt is enlarged for a limited depth to receive a spiral spring 24d which is concentric with the axle-bolt and which is loaded to press the axle-bolt (by pressing the flange 24a) in a direction away from the boss 22a. Axle-bolt head 24c is knurled to form a thumb-turn. The axle-bolt may be turned thereby to permit adjustment of the tape drum 23 laterally in respect to the machine as a whole so as to adjust roll R of tape T behind cutter wheel 30 in proper alignment.

An idler roller 25 is rotatably mounted in a manner hereinafter described in the upper part of frame 22 approximately midway between tape holder drum 23 and cutter wheel 30 over which the tape may be led as it passes forwardly from the supply roll to the cutting mechanism, its non-adhesive side contacting the idler roller.

A second idler roller 26 around which the tape may be passed before it passes around the first idler roller is journaled onto horizontal shaft 27 which is rigidly fixed to boss 22b (Figure 4) on the lower part of the upright frame 22 below the first idler roller 25. The outer end of shaft 27 is threaded to receive thumb-turn 27a. Between the thumb-turn and the idler roller and likewise between the boss and the idler roller, are leather washers 27b so that when the thumb-turn is tightened, movement of the idler roller 26 is retarded because of the friction of the washers pressing against its two end surfaces.

In the present embodiment, the tape T is withdrawn from the supply roll R and propelled through the machine by reason of its temporary adherence to a series of tape-gripping elements which are carried by the cutter wheel 30, the latter being a part of the dispensing mechanism at the forward part of the machine. The cutter wheel 30 carries a series of "cutters" 37 that are pivotally mounted in spaced relationship around the periphery of the cutter wheel 30. These cutters 37 are shaped and positioned to provide in one member both the tape-gripping elements or surfaces 37a—37b and also the severing edges 37x (Figure 7).

Ordinarily the tension on the tape as it is being withdrawn from the supply roll by the pull of the cutter wheel, causes it to press against the tape-gripping elements 37a and 37b with enough force to make it adhere to said elements sufficiently to enable the elements to hold or grip the tape until it is removed at the dispensing station. But if atmospheric or other conditions require a greater pressure to be exerted, a pressing member may be employed to press the tape more firmly against the gripping elements. Such pressing member may be a roller 28 of resilient material such as rubber, preferably soft gum rubber, rotatably mounted on shaft 29 and positioned so that it presses against the gripping elements 37a, successively, as the cutter wheel 30 turns them past the roller.

Cutter wheel 30 is rigidly mounted on cutter wheel shaft 31 which is journaled into boss 22c perpendicular to the upright frame 22 and parallel with the base 21 and parallel with the axis of tape holder drum 23. Cutter wheel 30 carries a plurality of radially extending cutter arms 34. The number of cutter arms may vary. In the present embodiment there are six, spaced at intervals of 60°. Into the end of each cutter arm 34 there is journaled a cutter shaft 35 which extends parallel with the axis of cutter wheel 30. On the right end of each cutter shaft 35 there is rigidly fixed a quadrant shaped cutter cam 36. On the left end of each cutter shaft 35 there is rigidly removably attached a cutter 37.

As cutter wheel 30 turns, the weight of cutters 37 tends to turn their respective cutter shafts 35. As is hereinafter described, it is desirable that cutter shafts 35 be allowed to turn only when they are made to turn by their respective cams 36 striking pins 55 and 56. Some form of braking means is desirable. Accordingly, in each cutter arm 34 a hole extending radially with respect to cutter wheel 30 is bored from the outer tip of the arm inwardly toward, but not as far as, the center of cutter wheel 30, the center line of the hole intersecting the center line of the cutter shaft 35. Spiral spring 38 is placed therein (Figure 6) loaded to press the leather disc 39 against the cutter shaft 35 sufficiently to brake the shaft against casual turning but not to brake it against the turning caused by cam 36 sriking the pins 55 and 56.

Cutters 37 may be of square or rectangular or other shape in cross section. In the present embodiment they are U shaped, each tip of the U being ground to form a cutting edge (Figure 7). Surfaces 37a and 37c are ground, polished and lapped to form the cutting edge 37x; likewise surfaces 37b and 37d are ground, polished and lapped to form the cutting edge 37y. When a cutter 37 is fastened to its cutter shaft 35 in the position shown in Figure 7, then 37x is the cutting edge that is in use. When edge 37x becomes dull, screws 40 may be removed, the position of the cutter reversed, and the cutter reattached to cutter shaft 35 by screws 40 through holes 41, thereby placing the fresh edge 37y in position to be used as a cutting edge.

The cutting edges of each cutter are preferably parallel with the axis of cutter wheel 30, and therefore parallel with the axis of the tape holder drum 23.

Both of the lands 37a and 37b (Figure 7) of any one cutter lie in approximately the same plane, and it is this series of pairs of lands around the cutter wheel 30 that form the tape-gripping elements to which the tape T adheres so that the turning of the cutter wheel draws the tape through the machine.

Cutters 37 are preferably of very hard material. In the present embodiment they are of case hardened steel.

Forwardly of the cutter wheel 30 is positioned the "anvil member" which co-acts with the cutter wheel to sever the tape by reason of the severing edges 37x pressing the tape against said anvil member. In the present embodiment the anvil member is a rotatably mounted cylinder or cutting roller 45 positioned to permit it to contact the cutting edges 37x of each of the cutters 37 successively as the cutter wheel 30 turns.

The cutting roller 45 and the cutting edges 37x may be shaped and/or positioned so that a cutting edge contacts the roller at only a single point at any one time with the result that in operation, an edge contacts the roller point by point along the edge's length which is preferable to having the full length of the edge contact the roller all at once. In the present embodiment this is accomplished by positioning the cylindrical cutting roller 45 in angular relation to the straight edges 37x.

This angular relation makes it necessary for the cutter or the cutting roller or both to move for some distance in relation to each other so as to bring the full length of any one cutting edge 37x into contact point by point with the cutting roller 45. In the present embodiment substantially all of the relative movement of the two parts past each other is effected by movement of the cutters 37.

Since each cutting edge thus moves for some distance in a circular path while it is in contact with the cutting roller, and since the cutting roller is preferably made of a relatively unyielding substance, and since it is preferable to have the full length of each cutting edge contacting the cutting roller at a substantially uniform pressure and at a pressure approximately equal to that of the other cutting edges, and for other reasons, the cutting roller is held yieldably rather than rigidly in its normal position.

For this purpose an angular member having an upwardly extending arm 46 and a horizontally extending arm 46a is pivotally mounted on the upright frame 22 by being journaled onto the axle-bolt 47 with its upright arm 46 equipped to hold rotatably the cutting roller 45 and with the end of its horizontal arm 46a pierced to receive the vertical threaded shaft 48. Axle-bolt 47 pierces boss 22d and is in threaded engagement therewith, said engagement being sufficiently tight to make axle-bolt 47 relatively rigid in the frame 22 but adjustable by turning axle-bolt head 47a.

The axis of the axle-bolt 47 is preferably parallel to the cutting edges of the cutters although it may vary from that so long as no point of the cutting roller is moved so far that it fails to contact the cutter at the required pressure. In the present embodiment the desired angular relationship between the cutting roller 45 and the cutting edges 37x is secured by bending the upright arm 46 to the left of vertical (Figure 4) to form an acute angle with the axis of axle-bolt 47. However such desired angular relationship may also be secured by other means, for example, by placing axle-bolt 47 at the required angle to horizontal and by tipping the upright shaft 48 so that it is perpendicular to the axle-bolt; or the axle-bolt 47 may be horizontal, the upright arm 46 vertical with the cutting roller 45 mounted at an angle therein; etc.

The lock nut 49, being in threaded engagement with the shaft 48 below the horizontal arm 46a, is set so that when the arm rests upon it, the cutting roller 45 will occupy a desired position, i. e. at the nearest point to the cutter wheel 30 to which it comes at any time during the operation of the machine. The horizontal arm 46a is yieldably held down against the lock nut 49 by the heavy spiral spring 51, whose upper end is adjustably stopped by the lock nut 50, at a tension sufficient to exert a pressure between severing edges 37x and cutting roller 45 during their time of contact to sever the tape T.

The anvil member 45 is preferably made of relatively hard material, though preferably softer than the cutting edges 37x. In the present embodiment, it is of steel. Brass, copper, aluminum, and other softer materials have been used successfully, but rollers of such materials tend to become scored too rapidly by the cutters. The roller's periphery is preferably smooth. It gradually becomes scored by the cutting edges but will stand considerable use before needing replacement.

Slightly above cutter wheel 30 two cutter cam pins 55 and 56 are rigidly fixed to frame 22, protruding outwardly therefrom toward the cutter wheel. Pin 55 is positioned so as to strike each one of the cutter cams 36 on one of their two straight sides as cutter wheel 30 turns counter-clockwise (Figures 1 and 11). This turns cutter shafts 35 one by one so as to raise the cutters from the cutting position of cutter 37—2 to the dispensing position of cutter 37—1 as they are shown in Figures 9 and 10. Pin 56 is positioned so as next to strike the cams on their other straight sides as they pass and thereby to lower the cutters back again from dispensing to cutting position.

Cutter wheel 30 is driven by worm gear reduction motor M through the Geneva wheels 60 and 61, which transmit the motion intermittently, as is well known in the art. Motor M is rigidly fixed to the frame 22 by being mounted onto the hollow boss 22e by screws 58.

Power shaft 62 is the worm wheel shaft of the worm gear reduction box of the motor M and is journaled into boss 22f which is a part of upright frame 22.

On shaft 62 is rigidly mounted the driver Geneva wheel 60 which carries two driving pins 60a and 60b located 180° apart.

The driven Geneva wheel 61 is rigidly mounted on the end of cutter wheel shaft 31 opposite to the end on which cutter wheel 30 is mounted. It has six radial slots located 60° apart. At each half revolution of the Geneva driver 60, either the pin 60a or the pin 60b engages one of these slots and turns the driven Geneva wheel 61, and with it cutter wheel 30, one-sixth of a turn. Just as either pin (60a or 60b) is leaving any one slot at the end of a turn, the convex surface 60c of Geneva driver 60 engages the next successive concave surface 61a of driven Geneva wheel 61 so that wheel 61, and with it cutter wheel 30, is stopped precisely at the end of 60° of turn and is held there until the next pin (60a or 60b) moves around to engage the next slot.

As will be hereinafter explained in the description of the mode of operation, the portion of the machine thus far described may be operated as an automatic tape dispenser. The parts next to be described provide it with applier means.

The top of upright frame 22 is finished so as to support a guiding means in the form of a table-like plane surface preferably parallel with the base 21, across which are propelled the boxes, packages, etc., which are to be sealed. This table may conveniently take the form of the top of a sheet metal case which encloses the entire machine, as shown in the present embodiment, with a plane surface top 65, sides 66 and 67, and ends 68 and 69, all removably secured to base 21 by screws 70. Most of the left side 66 is in the form of a door 71 hinged at the bottom and held by a latch 72 that engages the top 65 so that the machine may be serviced therethrough without removing the entire casing. A rectangular aperture or slot ABCD is cut out of top 65 (its position is shown in dotted lines in Figure 3) to permit certain parts of the machine to extend up through the top, as hereinafter described.

Below the slot and immediately to the rear of and slightly above cutter wheel 30 a lower roller 75 is journalled on a shaft 76 which is rigidly fixed in frame 22 perpendicular thereto and parallel with base 21. The top of this lower roller is preferably flush with or perhaps slightly above the upper surface of casing top 65, but it may also be slightly below said surface.

To the rear of this lower roller there is journaled into boss 22i the shaft 77 on which are rigidly mounted the two parallel arms 78a and 78b which curve upwardly and forwardly, extending through the slot, and between whose ends is rotatably mounted the upper sealing roller 79. The curve in the arms may be angular or a square elbow-like turn, or of any convenient shape to prevent their contacting the objects being propelled through the machine.

The right end of roller arm shaft 77 extends for a distance beyond the supporting boss 22i. Around this extending portion of the shaft, concentric with its axis, is placed a spiral spring 80, its right end fixed to the shaft, its left end to boss 22i and loaded to revolve the shaft in a direction to press roller 79 downwardly upon roller 75.

The two sealing rollers 75 and 79 are preferably of a resilient material such as rubber.

The drawing shows roller 75 as being directly below roller 79. It may be slightly forward of the position shown. Also it may be considerably to the rear thereof so long as the axis of upper roller 79 does not come below the top surface of the table or top 65. If the top of lower roller 75 is below the surface 65 so that it does not serve as a sealing roller, then the roller 75 need not be a rotatable element, but may be any means that will stop the forward swing of upper roller 79 and also bend the piece of tape T—1 upwardly in the manner hereinafter described in the "Mode of operation."

Directly below the upper sealing roller arm 78b the switching arm 85 is rigidly fixed to switching shaft 86 which is journaled into frame 22 perpendicular thereto at the point where the frame is reinforced by boss 22g. Idler roller 25, previously described, is journaled on the left end of shaft 86.

Switching arm 85 extends outwardly from its shaft 86 so that its end will be contacted and pressed downwardly by the convex portion of upper sealing roller arm 78b when the latter turns counter-clockwise (Figure 11) about the axis of its shaft 77.

At the opposite or right end of switching shaft 86 the spring arm 87 is rigidly removably attached thereto by screw 88. Its downwardly extending free end is attached to the boss 22e by a spiral spring 89 which is adjusted so that after switching arm 85 has been depressed by the upper sealing roller arm 78b, the spring 89 will draw spring arm 87 and with it switching arm 85 back again to the normal or starting position which they are shown as occupying in all the figures except Figure 11. Retention in normal position may be secured by a suitable adjustable stop against which spring 89 may hold the arm, or, as in the present embodiment, by adjusting the tension of spring 89 to equal the downward pull exerted by the weight of switching arm 85 when the parts are in normal or starting position.

A leaf spring 90 is also removably rigidly attached to the right end of switching shaft 86 at the same point as is spring arm 87 and by the same screw 88. It extends downwardly and is adjusted in a position forward of spring arm 87 so that when switching arm 85 is depressed, the leaf spring 90, turning in unison with it by reason of their rigid attachment to the same switching shaft 86, will press the "on" point 91 of reset "microswitch" 92 which is rigidly fixed to frame 22 at boss 22h.

By a "reset" switch is meant one having two pins, one of which is pressed to make the circuit and the other to break the circuit, such that when the "on" pin is pressed, the switch remains closed until the "off" pin is pressed, whereupon the switch opens and the "on" pin is raised to initial open position.

On the opposite or front side of switch 92 is the "off" point 93. This is pressed by leaf spring 94 which is rigidly attached to the front side of the switch by a screw. Leaf spring 94 is adjusted to bear against the switch cam wheel 95 which is adjustably mounted on power shaft 62 and adjusted so that its cams 96 as they pass will press leaf spring 94 rearwardly far enough to press the "off" point 93 of the switch 92.

The supply of electric power to the entire machine may be controlled by a snap switch 100 shown set into the right side 67 of the casing. Connections are shown in the circuit diagram Figure 8. A terminal block may be used, its housing being shown at 101.

The top 65 of the casing may be provided with guides (not shown) to prevent lateral movement of boxes, etc., as they are being propelled across the machine during sealing and to permit a piece of tape to be placed on each box at a uniform distance from a given edge of such box.

*Mode of operation*

A roll R of pressure-sensitive adhesive tape T is mounted on the drum 23, and positioned so that when the tape is led from the supply roll R to the cutter wheel 30, the adhesive side faces up. The axle-bolt 24 on which the drum 23 is journaled, is moved to the right or left (in relation to the machine) by turning the thumb-turn 24c until the roll R is aligned directly behind the cutters 37 on the cutter wheel 30.

The tape is led from the roll R over the idler roller 25 to the cutter wheel 30. Since the tape is withdrawn from the supply roll and propelled through the machine by the cutter wheel, and since the propelling force of the cutter wheel is exerted on the tape by reason of the tape's temporary adherence to the series of tape-gripping elements 37a—37b on the cutters 37 which are on the cutter wheel, it is necessary to secure proper adhesion between the tape and the surfaces 37a—37b. The pull necessary to withdraw the tape from the roll over the idler roller 25 usually provides pressure enough to secure the necessary adhesion. But if, due to atmospheric or other conditions, greater pressure is needed, the tape may be led first around idler roller 26 as shown by the dotted line T' in Figure 1 and then around roller 25. The tape's adhesive side contacts roller 26, and consequently there is temporary adherence as the tape is drawn through the machine so that braking the roller 26 brakes the movement of the tape. To effect this, thumb-turn 27a may be tightened to press the leather washers 27b against the ends of roller 26. The machine may be equipped with the pressing roller 28 either as an alternative to the use of roller 26 or in addition thereto. Roller 28 presses the tape into firmer adhesive engagement with the surfaces 37a as they are successively turned past it.

The tape is then trained around the cutter wheel in adhesive contact with the tape-carrying surfaces 37a—37b. In practice this is best done by hand as far as cutter 37—3 (Figure 9) and by the power mechanism (whose operation is hereinafter described) for the rest of the way, that is, until the first severed length of tape T—I is held out by the cutter 37—I in dispensing position at the dispensing point or station (Figure 9).

The box B, or other object to which tape is to be applied around its lower edge in the manner shown in Figure 13, is placed on the top 65 of the casing and is pushed or otherwise advanced rearwardly along the top 65 toward the severed vertically held piece of tape T—I in the direction of the arrow (Figure 9). The box contacts the tape T—I and continues to move until the box is pressing the tape T—I against the upper sealing roller 79. The adhesive side of the tape faces the box B and it therefore adheres thereto. As the box continues to advance, the roller 79 is thereby forced to swing rearwardly and upwardly on the pivotal mounting 77 of its supporting arms 78a and 78b. This presses the upper portion of the tape T—I against the end of the box B by reason of the roller 79 rolling upwardly along the tape's length with the spiral spring 80 acting to press the roller 79 against the advancing box (Figure 10). After the roller 79 has reached the top of its swing, the continued advance of the box causes it to swing further about the shaft 77 whereupon it moves downwardly along the tape T—I until it reaches the lower edge of the box and is entirely over-ridden by the advancing box, as in Figure 11.

Meanwhile, directly after the box first contacts the tape T—I and begins to carry it along, the lower portion of the piece of tape T—I is thereby pulled loose from the tape-gripping elements 37a—37b on the cutter 37—I, and is bent or directed upwardly towards the bottom of the box by the lower roller 75. If roller 75 is positioned high enough to contact the bottom of the box, it will then serve as a sealing roller also and will press tape T—I against the bottom of the box. In either case, the upper roller 79 presses the full length of the lower portion of tape T—I upwardly against the bottom of the box as the box continues to advance over it, as shown in Figure 11.

Thus the full length of the piece of tape T—I is pressed against the side and bottom of the box. Some parts of it are pressed twice and all of it may be pressed twice if lower roller 75 is positioned high enough to act as a sealing roller.

The above described applier means and mode of operating the same provide a tight seal and if desired, the spring 80 which presses the upper roller 79 against the box, may be tightened enough to bend the sides 106 of a box cover inwardly until they touch the sides 109 of the box and to seal them in that position, as shown in Figure 13.

The box continues to be advanced after sealing until it is clear of the roller 79, whereupon the spring 80 returns the roller to its starting position by swinging it forwardly until it is stopped by resting upon the lower roller 75.

In the meantime the downward movement of upper roller arm 78b has depressed the switching arm 85 (Figure 11) which, through its shaft 86, moves spring arm 87 (Figure 5) and with it leaf spring 90 forwardly a sufficient distance to press the "on" point 91 of reset switch 92.

The box B, advancing at what has been found to be a reasonable operating speed, will almost immediately thereafter have passed on beyond the upper roller 79, whereupon roller 79 is swung back to its starting position (Figure 9) by spring 80 (Figures 3 and 4). The switching arm 85 is thereby released and is returned to starting position (Figure 9) by the pull of the spring 89 on arm 87 (Figure 2) which moves switching arm 85 by means of their common shaft 86; and this movement also removes the leaf spring 90 from the "on" point 91 of the switch, thus rendering the "on" point free to reset itself, i. e., to snap back into starting position when the "off" point is pressed later on.

Pressing the "on" point 91 of the switch 92, as above stated, starts the motor M which turns the power shaft 62 clockwise (Figure 5). The lower or driver Geneva wheel 60, being rigidly mounted thereon, turns with it and drives the upper Geneva wheel 61 in a manner well known in the art, namely, by reason of the driving pin 60a (in alternation with pin 60b) engaging one of the radially extending slots of the upper wheel.

When the lower Geneva wheel begins to turn, the upper wheel, by reason of the lowermost one of its six concave surfaces 61a being engaged by the upper one of the two convex surfaces 60c of the lower wheel, is held motionless until the said surface 60c is turned past the said concave surface 61a. At that moment the pin 60a engages its complementary radial slot in the upper wheel, which, being now free to turn, is turned counter-clockwise (Figure 5). Its movement for each turning impulse (by either of the pins 60a or 60b) is limited to 60° of turn because at the end of that distance the pin 60a (or 60b) leaves its radial slot thereby ceasing to drive the upper wheel and at the same moment the next convex surface 60c engages its complementary concave surface 61a, thereby locking the upper wheel against any further movement. At or about this time, one of the cams 96, which is on the adjustable switch cam wheel 95, presses the leaf spring 94 rearwardly (to the left in Figure 5) far enuogh to press the "off" point 93 of switch 92. The cam wheel 95 may be adjusted to switch off the motor at such a point that the motor will coast to a stop before the next pin 60b (or 60a) engages the upper wheel. Since no turning impulse is applied to the upper wheel from the time the pin 60a (or 60b) leaves its slot until the other pin 60b (or 60a) enters the next slot, the lower wheel has 120° or "coast" which has proved to be ample when the motor acts through worm gears, as in the present embodiment.

It is thus seen that the depressing of the switching arm 85 (Figure 11) and the prompt release thereof (both the depressing and releasing being initiated by the movement of the box B across the surface 65 of the casing top) causes the upper or driven Geneva wheel 61 to turn exactly 60°, then to stop and to be locked against further turning until the next box is advanced far enough to depress the switching arm again. The maximum amount of time that the box can be permitted to hold the sealing roller 79 down (and with it the switching arm 85, Figure 11), must be within the time it takes for the cam 96 to turn far enough to cause the "off" point 93 of switch 92 to be pressed, for if the yieldable pressure of leaf spring 90 against the "on" point (Figure 5) is continued, it will again press the "on" point so as to start the motor for a second cycle as soon as cam 96 coasts far enough to release the "off" point. As described above, in a reset switch such as is here illustrated, the "on" point resets as soon as the "off" point is pressed, and vice versa.

The upper Geneva wheel drives the cutter wheel 30, by means of their common shaft 31, counter-clockwise (Figures 9, 10 and 11). The tape, as previously explained, is trained around the cutter wheel in contact with the tape-gripping surfaces 37a—37b, and it also passes over the severing or cutting edges 37x on each of the rutters 37. As the cutter wheel turns, these cutting edges successively press against the anvil member or cutting roller 45, each edge contacting the roller point by point along its own length until the entire length of the cutting edge has been pressed against the roller, whereby the tape which lies between the edge and the roller, is severed.

This severing is shown in the present embodiment as coming just at the end of a "dispensing cycle" or 60° movement of the cutter wheel. In Figure 9 the piece of tape T—2 is shown as having just been severed, the cutter wheel is motionless and the piece of severed tape is held on the surfaces 37a—37b of cutter 37—2 by reason of its adherence thereto, in readiness to be raised up at the end of the next cycle into the position which the piece T—1 now occupies in Figure 9.

In Figure 11 the next cycle is halfway completed. The turning of the cutter wheel has brought the cam 36 of cutter 37—2 into contact with cam pin 55 whereby cutter 37—2 is being raised into dispensing position. The piece 37—3 is not yet severed but will be at the end of the cycle when it is pressed between the cutting edge 37x of cutter 37—4 and the cutting roller 45. The cutter 37—1 which originally held the piece of tape T—1 has been turned back down again into cutting position by reason of its cam 36 contacting the cam pin 56.

Thus it is seen that, without touching the tape or any part of the machine, an operator may seal the bottom edges of a box in the manner shown in Figure 13 simply by propelling the box rapidly across the top of the illustrated machine, and that as soon as one piece of tape is thus applied a succeeding piece is quickly and automatically positioned in readiness for the next application.

Where two machines are placed with their "tops" facing each other (Figure 12) two edges of the same box can be sealed simultaneously. For example, the box in Figure 13 can be sealed with pieces 107 and 108 by being propelled only once between the machines in Figure 12.

Reference is made earlier in the description to threading a fresh roll of tape through the dispenser partly by hand and partly by the power mechanism. It may now be seen that the hand threading would go probably as far as cutter 37—3 in Figure 9 and that successive depressions of the switching arm 85 by hand would turn the cutter wheel until a piece of tape (as T—1 in Figure 9) is positioned for dispensing.

In the same manner the present machine serves as a dispenser of lengths of tape for use by application to objects otherwise than by propelling the objects across the top, e. g., by hand. For such use, sealing rollers may be disregarded, or omitted entirely from the construction. After the removal and use of a piece of dispensed tape, such as the piece T—1 in Figure 9, a second piece may be quickly severed and positioned ready for use simply by depressing the switching arm 85 by hand. No other handling of the tape or machine is required.

Dispenser units embodying the principles of my invention may be built into packaging and wrapping machines, etc.

It will be apparent that very accurate measurement of lengths of tape can be secured. This is of especial advantage when dispensing tape that is printed to form a series of labels, stickers, trade-mark emblems, etc.

It will also be apparent that the severing means here employed provides a smooth straight cut and smoothness of the severing members prevents their becoming clogged with adhesive.

"Tape" and "sheet material" are regarded as being interchangeable terms wherever used throughout the specification and claims, that is, "tape" is used generically to refer to sheets which are long in proportion to width.

Also the terms "top," "above," "below," etc., are relative terms and not limiting terms, since for example, the machine may be used when on its end or side as in Figure 12 in which position the "top" or table 65 would not be horizontal or uppermost.

What I claim is as follows:

1. In a device for dispensing tape, means for holding a supply roll of tape, a cutter wheel adapted to receive tape from the roll and an anvil member adjacent to said cutter wheel, said cutter wheel having tape-gripping means positioned thereon adapted to contact a portion of the tape, severing means on said wheel positioned in such a manner that the tape passes over said severing means when it is trained around the wheel, the said wheel being positioned so as to press the severing means against the anvil member as the wheel rotates, thereby severing the tape with the severed portion still held by the tape-gripping means.

2. In a device for dispensing adhesive tape, means for holding a supply roll of tape, a cutter wheel adapted to receive tape from the roll and cut it into desired lengths, an anvil member adjacent to said cutter wheel, said cutter wheel having a plurality of tape-gripping elements of limited area positioned on said wheel in spaced relationship adapted to contact the tape at spaced-apart portions, a plurality of severing edges positioned on said wheel in spaced relationship in such a manner that the tape passes over the severing edges when it is trained around the wheel, said severing edges being positioned in such a manner that they are successively pressed against said anvil member as the wheel rotates, thereby severing the tape, and such that the severed lengths of tape are held by the tape-gripping elements.

3. The device of claim 2 in which the anvil member is a rotatably mounted cylinder.

4. The device of claim 2 in which the anvil member is a rotatably mounted cylinder positioned angularly in relation to the said cutting edges and is yieldably mounted adjacent the cutter wheel so that the pressure of said severing edges against said cylinder will be substantially uniform during the periods of contact therewith.

5. In a device for dispensing adhesive tape, means for holding a supply roll of tape, a cutter wheel adapted to receive tape from a roll and cut it into desired lengths, adapted to contact the tape over a limited area so as to leave portions of the tape free from contact to facilitate removal, a plurality of severing edges positioned on said wheel in spaced relationship in such a manner that the tape passes over the severing edges when it is trained around the wheel, and cooperating means positioned so as to coact with the severing edges as the wheel rotates in a manner to effect severance of the tape.

6. In a device for dispensing tape, means for holding a supply roll of tape, a wheel adapted to receive tape from the roll, said wheel having tape-gripping means positioned thereon adapted to contact a portion of the tape, means on the wheel and means adjacent to said wheel adapted to coact to sever the tape, one of the said coacting means comprising a cutting edge and the other comprising a member against which the edge may press the tape, the said two coacting means being positioned so that the tape is pressed therebetween as the wheel rotates, whereby the cutting edge severs the tape with the severed piece still held by the tape-gripping means.

7. In a machine for dispensing lengths of pressure sensitive adhesive tape, in combination, a feed device for drawing the tape from a source of supply, said device including a plurality of spaced tape engaging surfaces to which the tape is adapted to adhere, at least one of said surfaces having a cutting edge, means for advancing the surfaces to advance the adhered tape, and means adjacent the feed device and cooperative with said cutting edge to effect severance of the tape along said edge.

8. In a machine for dispensing lengths of pressure sensitive adhesive tape, in combination, a feed device for drawing the tape from a source of supply, said device including a plurality of spaced tape engaging surfaces of sufficient area to provide effective tape adhesion, at least one of said surfaces having a cutting edge, means for advancing the surfaces to advance the adhered tape, and means adjacent the feed device and cooperative with said cutting edge to effect severance of the tape, said edge and cooperative means being constructed and arranged to effect severance of the tape progressively from one side to the other thereof.

9. In a machine for delivering lengths of pressure sensitive adhesive tape, in combination, a rotary wheel-like feed device for drawing the tape from a source of supply, said device including a plurality of surfaces adapted to contact and adhere to the adhesive side of the tape as it is drawn from the source of supply, at least one of said tape engaging surfaces having a transversely extending cutting edge thereon, and a member adjacent the feed device and cooperating with said cutting edge to effect severance of the tape adhering to the surface having said cutting edge between said member and said edge.

10. In a machine for dispensing lengths of pressure-sensitive adhesive tape, in combination, a feed device for withdrawing the tape from a source of supply, the said device including a plurality of spaced surfaces of sufficient area to provide effective adhesion for a length of tape, means for supporting the said adhesion surfaces for movement in an orbital path, a cutting edge on the feed device underlying the tape for severing the leading end of the tape in rear of a surface to which the leading end is adhered whereby the severed length will be retained by adhesion to such surface for delivery to the operator, and an anvil member adjacent the feed device against which the cutting edge presses as the device moves in its path with the tape between the edge and the anvil member to sever the tape.

11. The machine of claim 10 in which the anvil member is a rotatably mounted cylinder.

12. In an adhesive tape dispenser, a rotatable wheel having a plurality of peripheral gripping means extending parallel to its axis adapted to receive tape from a roll thereof and carry it to a dispensing station, each of said gripping means being adapted to turn on a peripheral axis parallel to the axis of the wheel, means for severing the tape into successive pieces as said wheel rotates so that each severed piece is thereafter held by gripping means at one end only leaving the other end free, means for turning each gripping means after tape held thereby has been severed to turn the held piece of tape so that it extends outwardly from the wheel in position for removal when rotation of the wheel brings it to the dispensing station, and means for intermittently rotating said wheel so that successive pieces of severed tape are brought to the dispensing station in step-by-step fashion.

13. In a machine for dispensing lengths of pressure-sensitive adhesive tape, in combination, a feed device for withdrawing the tape from a source of supply including a plurality of tape gripping elements in spaced apart relation, each element having a surface of sufficient area to provide effective adhesion for a length of tape, means for supporting the gripping elements for movement in an orbital path, means for severing the leading end of the tape in rear of an element to which the leading end is adhered whereby the severed length will be retained by adhesion to such element, and means for pivotally mounting the said gripping elements to permit their being turned to present their adhesion surfaces at an angle to the orbital path so that a severed length adhered thereto will extend outwardly from the feed device for delivery.

14. The machine of claim 13 with means for turning the said gripping elements about their respective pivots.

15. In an adhesive tape dispenser, a rotatable wheel having a plurality of peripheral gripping means extending parallel to its axis adapted to receive tape from a roll thereof and carry it to a dispensing station, each gripping means presenting a limited peripheral surface area to which the tape adheres with a major portion of the tape being free from contact, each of the said gripping means being adapted to turn on a peripheral axis parallel to the axis of the wheel, means for severing the tape into successive pieces as the wheel rotates so that each severed piece is thereafter held by gripping means, means for turning each gripping means after tape held thereby has been severed to turn the held piece of tape so that it extends outwardly from the wheel in position for removal when rotation of the wheel brings it to the dispensing station, and means for intermittently rotating the wheel so that successive pieces of severed tape are brought to the dispensing station in step-by-step fashion.

16. In a dispenser for normally tacky adhesive tape, a rotatable cutter wheel adapted to receive tape from a supply roll and cut it into pieces of desired length, having a plurality of spaced-apart gripping means disposed about its periphery and pivotally mounted, each gripping means presenting a limited peripheral surface area to which the tape adheres with the major portion of the tape being free from contact, the tape having its adhesive side facing inwardly and being unrestrained except by adhesion to the surfaces of the gripping means, a peripheral severing edge leading each gripping means and positioned to directly underlie the tape transversely thereof, an anvil roller yieldably mounted in position to angularly bear against the severing edges as they are successively brought into tape-severing position during rotation of the cutter wheel, the severing of a piece of tape resulting in its being held at its leading end only leaving the other end free, and means for turning the gripping means holding a piece of severed tape to project the free end of the piece out from the wheel in position to expose its inner adhesive surface and permit of ready removal.

17. In a dispenser for pressure-sensitive adhesive tape, a cutter wheel, a plurality of combined tape gripping and tape severing members, each member having a surface to which tape may adhere and a cutting edge, means for pivotally mounting the said members in spaced apart relation around the wheel's periphery with the said surfaces and edges underlying the tape when the latter is trained around the wheel, and an anvil roller rotatably mounted adjacent the wheel in position to have the said cutting edges bear against it as the wheel turns, the said pivotal mountings permitting the members separately to be turned to a position in which a cut piece of tape adhering to the surface will extend outwardly away from the wheel.

18. The device of claim 17 in which an edge of the said surface to which the tape adheres, forms the said cutting edge on each of the combined tape gripping and tape severing members.

ARTHUR A. ANDERSON.

REFERENCES CITED

The following references are of record in the file of this patent:

UNITED STATES PATENTS

| Number | Name | Date |
|---|---|---|
| 1,297,664 | Escobales | Mar. 18, 1919 |
| 1,877,042 | Pearce | Sept. 13, 1932 |
| 2,050,457 | Ohlsen | Aug. 11, 1936 |
| 2,052,883 | Kucklinsky | Sept. 1, 1936 |
| 2,133,341 | Bronander | Oct. 18, 1938 |
| 2,274,623 | Hawkins | Feb. 24, 1942 |